(12) United States Patent
Dean

(10) Patent No.: US 6,446,441 B1
(45) Date of Patent: Sep. 10, 2002

(54) MAGNETIC REFRIGERATOR

(76) Inventor: William G. Dean, 104 Compass Pointe Dr., Madison, AL (US) 35758

( * ) Notice: Subject to any disclaimer, the term of this patent is extended or adjusted under 35 U.S.C. 154(b) by 0 days.

(21) Appl. No.: 09/940,960

(22) Filed: Aug. 28, 2001

(51) Int. Cl.$^7$ ................................................ F25B 21/00
(52) U.S. Cl. ........................................................ 62/3.1
(58) Field of Search ............................. 62/3.1, 3.3, 467

(56) References Cited

U.S. PATENT DOCUMENTS

| | | |
|---|---|---|
| 4,457,135 A | 7/1984 | Hakuraku et al. |
| 4,464,903 A | 8/1984 | Nakagome et al. |
| 4,507,928 A | 4/1985 | Johnson |
| 4,509,334 A | 4/1985 | Nakagome et al. |
| 4,642,994 A | 2/1987 | Barclay et al. |
| 4,702,090 A | 10/1987 | Barclay et al. |
| 4,704,871 A | 11/1987 | Barclay et al. |
| 4,829,770 A | 5/1989 | Hashimoto |
| 4,956,976 A | 9/1990 | Kral et al. |
| 5,091,361 A | 2/1992 | Hed |
| 5,124,215 A | 6/1992 | Hashimoto |
| 5,182,914 A | 2/1993 | Barclay et al. |
| 5,213,630 A | 5/1993 | Hashimoto |
| 5,444,983 A | 8/1995 | Howard |
| 5,934,078 A | 8/1999 | Lawton, Jr. |

Primary Examiner—Chen-Wen Jiang
(74) Attorney, Agent, or Firm—Joseph H. Beumer

(57) ABSTRACT

A magnetic refrigeration system uses high-temperature side thermal diode modules with magnetocaloric material placed inside of hermetically sealed module containers. The material in the form of a porous matrix. The material comes into direct thermal contact with or is submerged in a hest transfer fluid, and a radical increase in heat transfer is obtained due to large surface area and pores in the material, which serve as nucleation sites and develop thin meniscus evaporating layers. These modules also contain special condensing surfaces and a means for return of condensed fluid to the evaporator. Various combinations with low-temperature side modules are also disclosed. A refrigeration system using the modules includes a rotatable disk on which a plurality of modules disposed radially on the disk are carried, and the disk is rotated in proximity to a magnetic field generator so that the material in the modules is intermittently magnetized and thereby heated. Sets of modules may be arranged to provide staging, thus producing refrigeration over a wide temperature range and enabling use of newer, high-performance materials which are glassy and difficult or impossible to fabricate into conventional heat-exchanger component shapes.

21 Claims, 6 Drawing Sheets

MAGNETIC REFRIGERATOR

FIELD OF INVENTION

This invention relates to magnetic refrigeration systems and more particularly to use of enhanced heat transfer measures in such systems.

BACKGROUND OF THE INVENTION

It has been known for many years that certain materials exhibit a property known as the "magnetocaloric effect," hereinafter designated as "MCE," in which the material undergoes a rise and fall in temperature upon being magnetized and demagnetized. Most of the materials which exhibit this property are rare earths and their compounds. This effect is due to changes in entropy as the material is magnetized and demagnetized. These entropy changes are due to varying degrees of order (or alignment) of the magnetic moments of the atoms as these materials are magnetized and demagnetized. Magnetization results in greater order, i.e., decreased entropy, while demagnetization results in increased entropy. Fortunately, these changes are reversible in certain materials. To account for the energy balance, there is an exchange between lattice and magnetic entropy and heat capacity on an atomic level. This phenomenon is most pronounced near the Curie temperature—that is, the temperature at which a ferromagnetic material becomes para-magnetic. If an MCE material is magnetized while thermally isolated, there is an increase in its temperature known as the adiabatic temperature rise, $^{dT}AD$.

Use of the MCE as a basis for refrigeration systems has been known for many years. The concept involved is to extract heat from the MCE material while it is magnetized and at an increased temperature, and then to demagnetize the material, causing the temperature to drop. While the temperature is low, heat is transferred from an object to be cooled to the MCE material. The MCE material is then magnetized again, increasing the temperature back to a high level, providing for extraction of heat and rejection of it to a heat sink. Upon repetition of this cycle, heat is transferred "uphill" from a low temperature to a higher temperature, which is the definition of refrigeration.

A critical feature required for implementing magnetic refrigeration systems is to ensure that heat flows in the proper direction at the proper time. In effect, a type of one-way thermal switch is needed on both sides of the MCE material so that the heat flows from the MCE material to the heat sink when the MCE material temperature is high but does not reverse and flow back into the MCE material from the heat sink when the MCE material temperature is low, (i.e., demagnetized). Likewise, a one-way thermal switch is needed between the object to be cooled and the MCE material which will allow heat to flow from the object to be cooled to the MCE material when the MCE material temperature is low, but not allow heat to flow back into the object to be cooled from the MCE material when it is at its high temperature (i.e., magnetized).

Early experimentation with this phenonmena resulted in attainment of very low temperature, but at very low capacity, only a small fraction of a watt, for example. Progress has been made over the years since these initial efforts, but practical applications have been limited. One of the limiting factors has been the low value of $^{dT}AD$, typically five to 15K, which is available to transfer heat through the system. In practical refrigeration, this is known as the "temperature lift." In the prior art, various means have been used for adding and extracting heat to and from the MCE material, all with a heavy toll on the $^{dT}AD$. For example, certain designs have used beds of spheres of MCE materials with a complex system of pumps, plumbing, switching valves and a controller to force fluids through these beds, divert the flow through heat exchangers, stop the flow or reverse the flow, as necessary, during each cycle while the MCE material is being magnetized/demagnetized. Other prior art has utilized small, close tolerance gas gaps filled with helium in an attempt to turn the heat flow on and off during the magnetization/demagnetization cycle. These gas gaps are between the moving MCE material and some type of stationary conduction member which then transfers the heat to a heat sink. In order for these gaps to transfer heat, they have to be small. These small gaps have created operational and manufacturing problems. In order to turn these gas gap thermal switches on and off in prior art, the helium gas pressure is repeatedly increased and decreased during each cycle, thus increasing and decreasing the thermal conductance. Other prior art has used heat pipes for transferring of heat in conjunction with the gas gaps. In these embodiments, the heat had to flow through numerous thermal resistances before getting into the heat transfer fluid of the heat pipes, thus using up most of the available $^{dT}AD$. These heat pipes were embedded in solid copper bars close to the moving MCE material. Heat was conducted from the MCE material, into the gas gap, through the gas gap, into a solid copper member, through the solid copper, through the wall of the heat pipe and into the heat transfer fluid. Such use of heat pipes is examplified by U.S. Pat. No. 4,642,994 wherein disks of MCE material were interleaved with heat pipes. The MCE material, however, was not placed inside of the heat pipe.

Other prior art has used regenerators of MCE material. In these devices heat transfer fluid has to be pumped through these regenerators first in one direction, and then stopped, and then pumped in the opposite direction, all within each cycle. Regenerators have also been used in combination with a displacer unit which cycled the heat transfer fluid back and forth through the regenerator and heat exchangers.

One of the problems presented in developing magnetic refrigerators is that some MCE materials, which exhibit the highest level of performance, have currently proven impossible to form into shapes having optimum heat transfer capability, in particular, fins, tubes, plates or beds of spheres as needed for typical heat exchanger components. These materials are brittle and susceptible to cracking, making them unsuitable for fabrication into conventional refrigerator component shapes.

SUMMARY OF THE INVENTION

The present invention is directed to a magnetic refrigerator in which MCE material is intermittently magnetized to produce heating, and heat is extracted from the MCE material while at elevated temperature. Upon demagnetizing the MCE material, its temperature drops. While the temperature is low, heat is transferred from the object to be cooled to the MCE material. The material is then magnetized again, raising the temperature back to its high level, where the heat is again extracted and rejected to a heat sink.

The refrigeration apparatus includes on its high temperature side a thermal diode module comprising a hermetically sealed container having an evaporator end and a condenser end, along with a heat transfer fluid for cycling between evaporation and condensation. At its evaporator end, and within the container, the module has an array of an MCE material disposed in the form of solid, porous matrix derived from finely divided particles and arranged for coming into direct physical contact with the heat transfer fluid during the high-temperature portion of the cycle.

Fabrication of the MCE material into a solid porous matrix obtained from finely divided particles results in a contact surface with a high surface area and significantly enhanced boiling characteristics, causing the process to approach the "isothermal compression" step in the equivalent gas cycle known as the Carnot Cycle, which has the highest efficiency of any known refrigeration cycle. The porous matrix of MCE material produces a boiling surface with a heat-transfer coefficient more than an order of magnitude higher than for a smooth surface. This enhanced surface can result in a heat transfer rate in excess of 200,000 Watts/$M^2$ at a temperature difference between the wall and fluid solution temperature of only one degree K.

The thermal diode module may also include measures to provide enhanced heat transfer at its condenser end such as providing fins of specially shaped cross sections, which drain the condensed heat transfer fluid into grooves, thus maintaining the maximum cold fin area exposed to the vapor being condensed, as described below for the low-side thermal diode module.

The apparatus using the module described above for the high temperature side also includes a low temperature side thermal diode module required to complete the cycle by transferring heat from the object to be cooled to the MCE material. This low temperature thermal diode module is similar to the high-temperature module, except that no MCE material is included. The low temperature side module has its evaporator end thermally coupled to the object to be cooled and its condenser end thermally coupled to the evaporator end of the high temperature module. The low temperature module at its condenser end may include multiple fins which, because of their design and shape, create a pressure gradient due to surface tension, which pumps the condensate off the fins and into grooves, thus continuously exposing the condensing vapor to a maximum area of the cold fins and maintaining a thin meniscus layer of liquid on the fin. This minimizes the thermal resistance due to conduction through the liquid layer.

In order to carry out a refrigeration cycle using the MCE material, the apparatus must include a means for intermittently subjecting the material to a magnetic field. This may be accomplished by providing a magnet which is movable, toward and away from the MCE material or by use of one or more stationary magnets, with the MCE material arranged for being moved in and out of the magnetic field. The magnetic field may be provided by permanent magnets, superconducting magnets or other appropriate means. In a preferred arrangement a plurality of MCE containing modules are disposed on a rotating carrier for being passed into and out of a single magnetic field or a series of magnetic fields. In addition to providing for intermittent magnetization, this rotation enables returning of condensed heat transfer fluid back to the evaporator end by means of centrifugal force.

It is, therefore, an object of this invention to provide a magnetic refrigerator apparatus wherein enhanced heat transfer from magnetized MCE material is obtained with a minimum of temperature difference.

Another object is to provide an improved high temperature side thermal diode module for such apparatus.

Other objects and advantages of the invention will be apparent from the following detailed description and claims appended hereto.

DESCRIPTION OF THE PREFERRED EMBODIMENT

Figure 1:
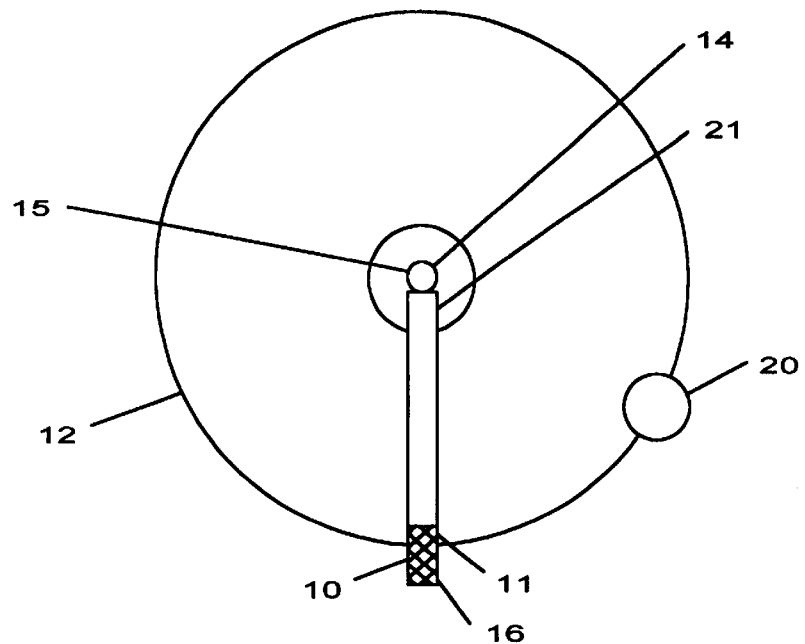
FIG. 1 is a simplified schematic view, showing placement and operation of a high-temperature side thermal diode module embodying the present invention.

Referring to FIG. 1 of the drawings, arrangement of a high-temperature side thermal diode module and associated elements of a magnetic refrigerator are shown schematically. The thermal diode module 11 is mounted on a rotating disk 12 with its evaporator end MCE porous matrix 10 at the outer edge of the rotating disk 12. The disk is rotated about a central axis 14 by means of a drive mechanism such as a motor 15. An array of finely divided MCE material, disposed in the form of a porous matrix, is located inside the evaporator end 16 of thermal diode module 11 near the circumference of the disk. The MCE material passes through the air gap of a stationary magnetic field generator 20 so that the MCE material moves into and out of the field as the disk rotates. As a result, the MCE material is alternately magnetized/demagnetized, and its temperature is thereby raised and lowered upon rotation of the disk. The condenser end 21 of the associated low-temperature side module is located at the opposite end near the axis.

Figure 2:
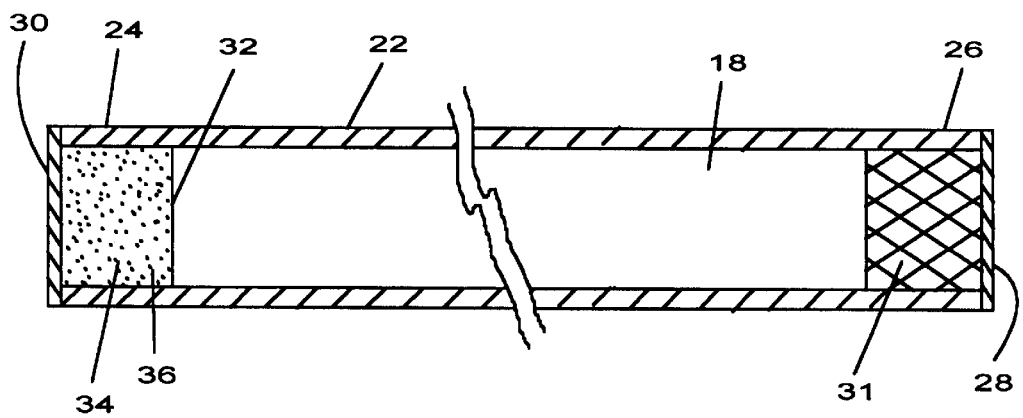
FIG. 2 is a sectional view showing details of a said high-temperature side module.
Figure 7:
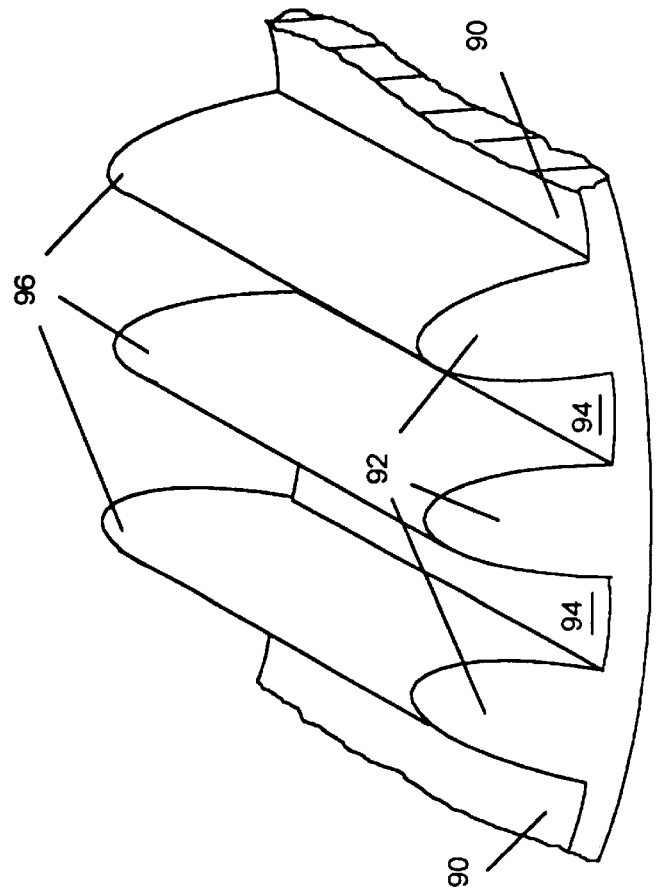
FIG. 7 is an isometric view of a condenser end heat exchange surface showing fins and grooves.

FIG. 2 shows a high temperature side thermal diode module 18 which comprises an elongated cylindrical container 22 having an outer evaporator end 24 and an inner condenser end 26, with end caps 28, 30, and being hermetically sealed. An array 32 of MCE material 34 disposed in a solid porous matrix 36 is placed around the inside of the container wall adjacent end cap 30 at the evaporator end 24. A condensing surface 31 is formed around the inside of the container wall at the opposite, inner end 26. The condensing surface may include heat transfer enhancing features such as fins, tubes, grooves, plates or other heat enhancing means. An enlarged view of a suitable surface structure is shown in FIG. 7, below.

In operation the thermal diode module (TDM) 18 of FIG. 2 allows heat transfer in virtually only one direction, that is, heat transfer in the reverse direction in this apparatus is negligible compared to the heat transfer in the forward direction for the portion of the cycle involved. Upon magnetization of the MCE, its temperature rises which causes the heat transfer fluid to evaporate. The resulting vapor then freely flows to the condenser end, where it condenses and gives up heat. The liquid condensate then returns to the evaporator where it recycles. The entire process operates at the saturation temperature of the heat transfer fluid corresponding to the design saturation pressure inside the hermetically sealed body. Since the heat transfer fluid changes phase, large amounts of heat are transferred by the latent heat of vaporization. Therefore large heat transfer is achieved at essentially constant temperature, i.e., at the saturation temperature. The TDM's operating temperature is set by the pressure inside the body. The pressure chosen is the saturation pressure corresponding to the saturation temperature for that fluid equal to the desired TDM operating temperature. A number of heat transfer fluids are available which span a wide range of temperatures from cryogenic to above room temperature. Some examples are water, acetone, ethanol, nitrogen, argon, neon and helium.

Figure 3:
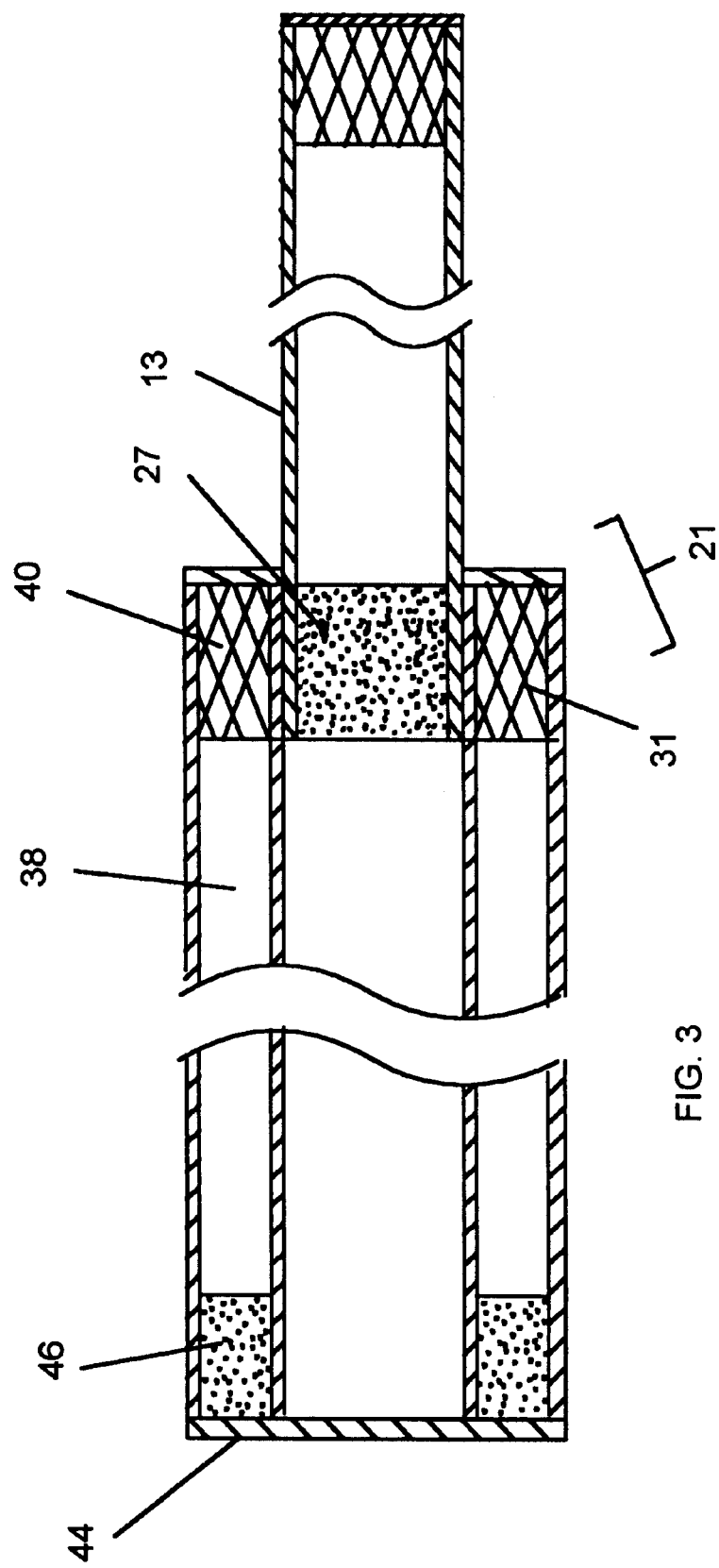
FIG. 3 is a compressed sectional view showing a refrigeration module having a pair of thermal diode modules aligned linearly in an integral device.

FIG. 3 shows a high temperature side module 13 integral with and linearly aligned with a low temperature side module 38 so as to provide a complete, combined heat transfer device 21. Module 13 in this device may have the same structure and mode of operation as for the module described above with respect to FIG. 2. The evaporator end 27 of this module is placed to be overlapped by condenser end 40 of low temperature side module 38 so that condensing surface 31 encircles and is disposed in thermal contact with the evaporator end 27 of the high temperature TDM with its porous matrix of MCE material. Module 38 has an evaporator end 44 where condensate from the condenser end is evaporated and recycled. The evaporator end may have an enhanced surface 46, including a metallic layer with fins, grooves or the like formed therein. This enhanced boiling surface may comprise a porous matrix wherein particles or spheres of a highly conductive material such as copper or silver are metallurgically bonded to each other and to the surface of the wall of the cylindrical, hermetically sealed container. A separate heat transfer fluid is provided in each of the linearly aligned modules of this embodiment. Specific fluids which may be used are the same as discussed above along with the information relating to temperature and pressure.

Figure 4:
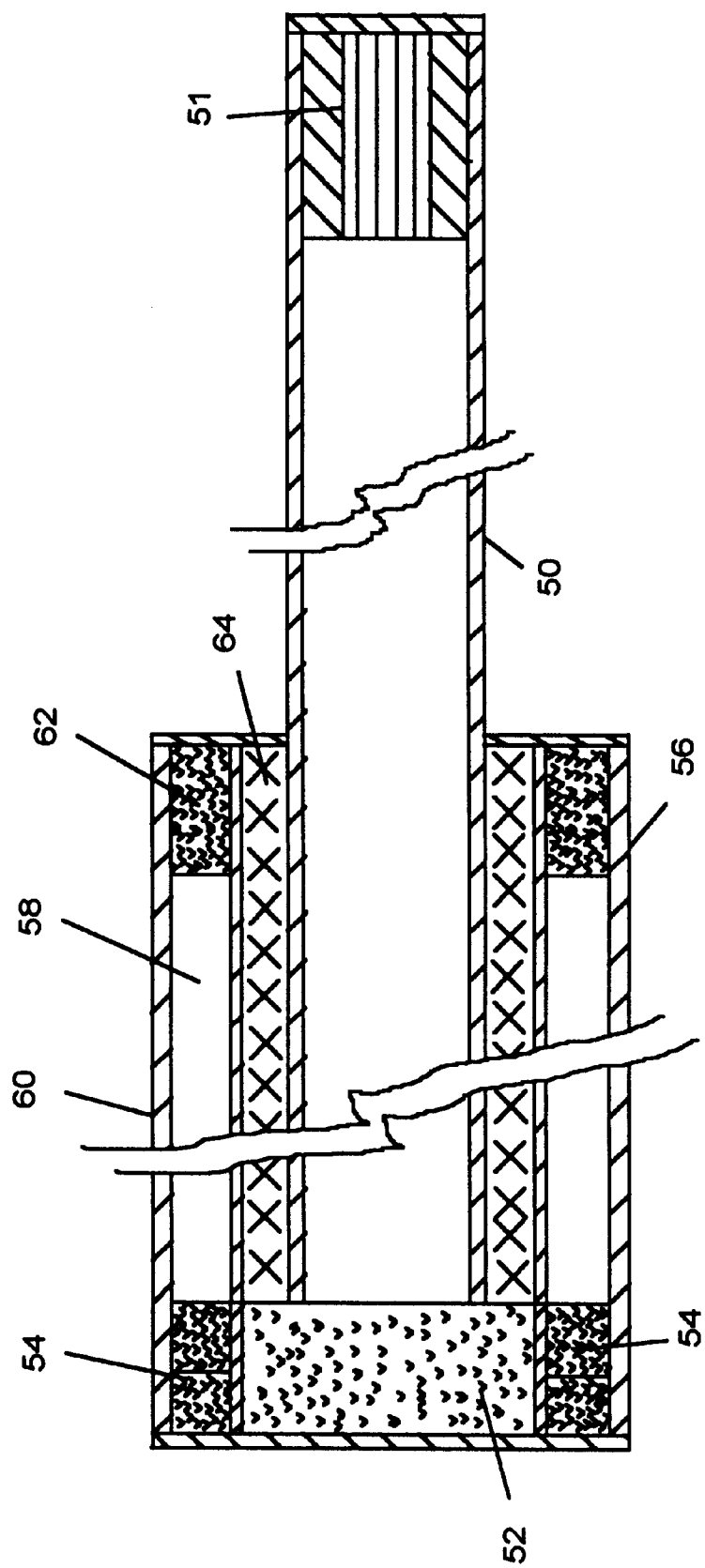
FIG. 4 is a sectional view of a refrigeration module with coaxially aligned thermal diode modules.

A coaxial arrangement for high temperature and low temperature side modules formed into an integral refrigerating module unit is shown in FIG. 4. In this embodiment a high temperature side module 50 extends all of the way through the middle of the device, along its axis, with low temperature side components encircling the high side module over a substantial portion of the high side length. In this embodiment the array 52 of MCE material is disposed around the inside of the evaporator for high side module 50 opposite from condenser end 51 and is spaced apart from, but in thermal contact with condensing surface 54 of the low temperature side module 56. The low temperature side module 56 has an annular plennum 58 inside of the outer container wall 60 which provides for passage of evaporated fluid from annular evaporating surface 62 to condensing surface 54. The annular region 64 between the two modules is provided with insulating material such as to improve thermal efficiency. Surfaces for evaporation and condensation in this concentric device may use the same structure as described for linear devices.

Various available MCE materials may be used in magnetic refrigerators embodying this invention, including for example; Gadolinium and some of its compounds, such as GdNi, $Gd_5(Si_2)$, $Ge_2$, $Gd_3Ga_5O_{12}$, GdPd, erbium and some of its compounds, dysprosium and some of its compounds, terbium and holmium and some of their compounds. Currently the highest performing of these MCE materials is the $Gd_5(Si_xGe_y)$ group. These materials are brittle, or glassy, and currently cannot be formed into typical heat exchanger shapes such as fins, tubes or plates. However, they can be conveniently crushed into finely divided particles which are ideal for incorporation into a porous matrix according to the present invention.

The MCE material is preferably provided at a particle size within the range of 10 to 1000 microns, which generally corresponds to the pore size in the matrix, with optimum pore sizes and particle size being selected for each specific application. Fluids with low surface tension and good wetability such as refrigerants require small size such as 10 to 200 microns, while fluids with higher surface tension such as water require larger sizes, typically 200 to 1000 microns. The porous matrix in which the MCE is incorporated may be formed by known methods, including sintering, brazing or fusing spheres or particles together using an electrical current or induction heater.

Figure 5:
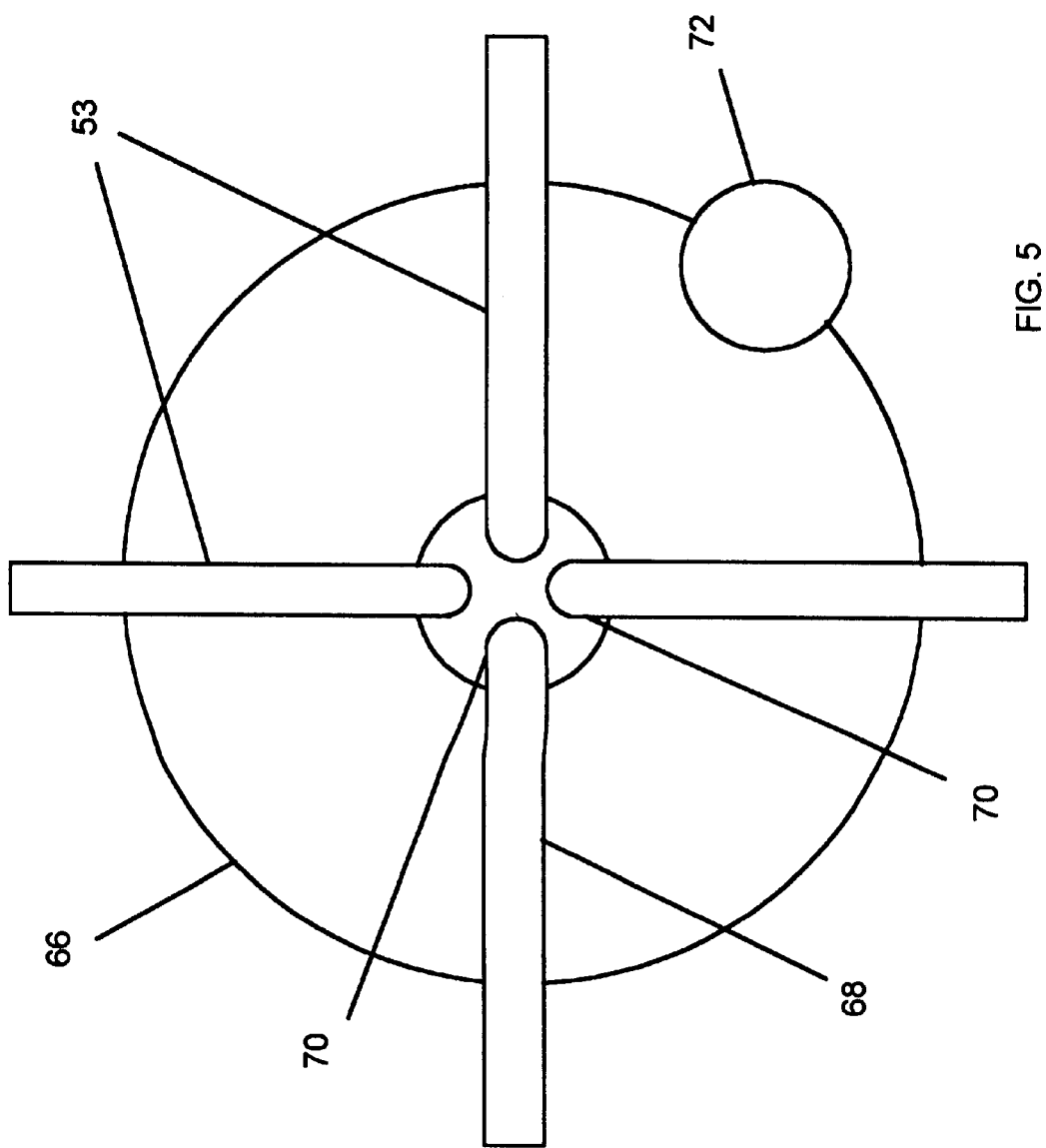
FIG. 5 is a schematic view of a magnetic refrigerating device comprising a plurality of modules carried on a rotating disk.

FIG. 5 schematically shows a magnetic refrigerator with multiple thermal diode modules 53 carried around the circumference of a rotating disk 66. These modules are disposed in elongated containers 68 extending radially across the disk, with low temperature side modules 70 located at the inside ends of the containers. This arrangement provides for movement of each of the multiple modules in and out of a magnetic field produced by generator 72, while avoiding the need for a separate generator for each module.

Figure 6:
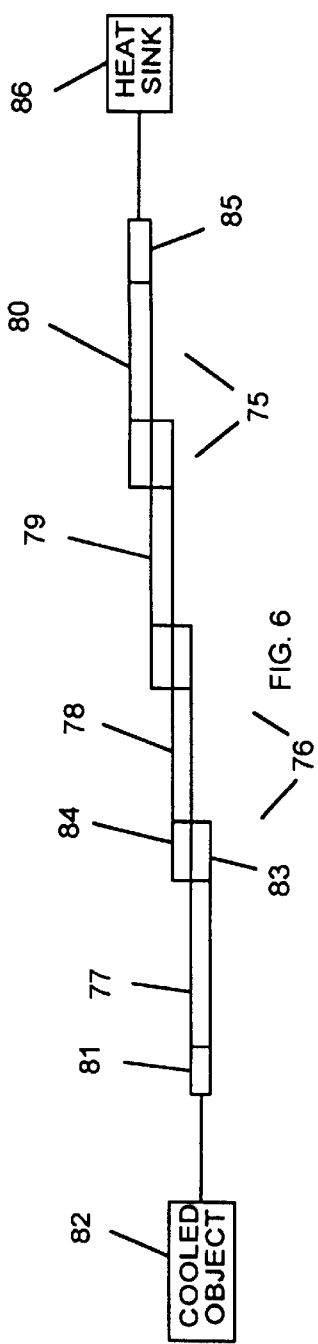
FIG. 6 is a schematic view of a magnetic refrigerator having a plurality of cooling stages.

FIG. 6 shows an embodiment wherein a plurality of thermal diode modules are formed into a staging arrangement for producing additional temperature lift. This embodiment involves a first thermal diode module 76 having a high temperature side thermal diode 77 and a low temperature side thermal diode 78 and a second thermal diode module 75 having a high-temperature side thermal diode 79 and a low-temperature side thermal diode 80. The evaporator end 81 of diode 77 is thermally connected to an object to be cooled 82, and the condenser end 83 of diode 77 is thermally connected to evaporator end 84 of module 78. The condenser end 85 of second stage module 78 is in turn thermally connected to a heat sink 86. This staging arrangement can be repeated as many times as needed to obtain any required temperature lift from the object to be cooled 82 to the heat sink 86. MCE materials for the various evaporator ends are chosen so that each subsequent stage lifts the heat load to higher and higher temperature levels. This feature overcomes one of the inherent difficulties encountered in the prior art, namely, the low value of $^{dT}AD$, the adiabatic temperature rise due to magnetization.

FIG. 7 shows a preferred structure for producing enhanced heat transfer on surfaces 90 of condensers at low temperature sides of thermal diode modules. The surfaces have fins 92 shaped to drain condensate off the fins and into condensate draining channels 94, thus maintaining the maximum contact area between the cold fin surface and the condensing vapor. The fins are constructed to have a small surface radius from the center to the outer edge near the tip 96 of the fin with a constantly increasing surface radius from the center to the surface in the area from the tip to channel. Operation of this structure is controlled by surface tension effects, and not by gravity, thus making this approach excellent for zero-g space applications.

Figure 8:
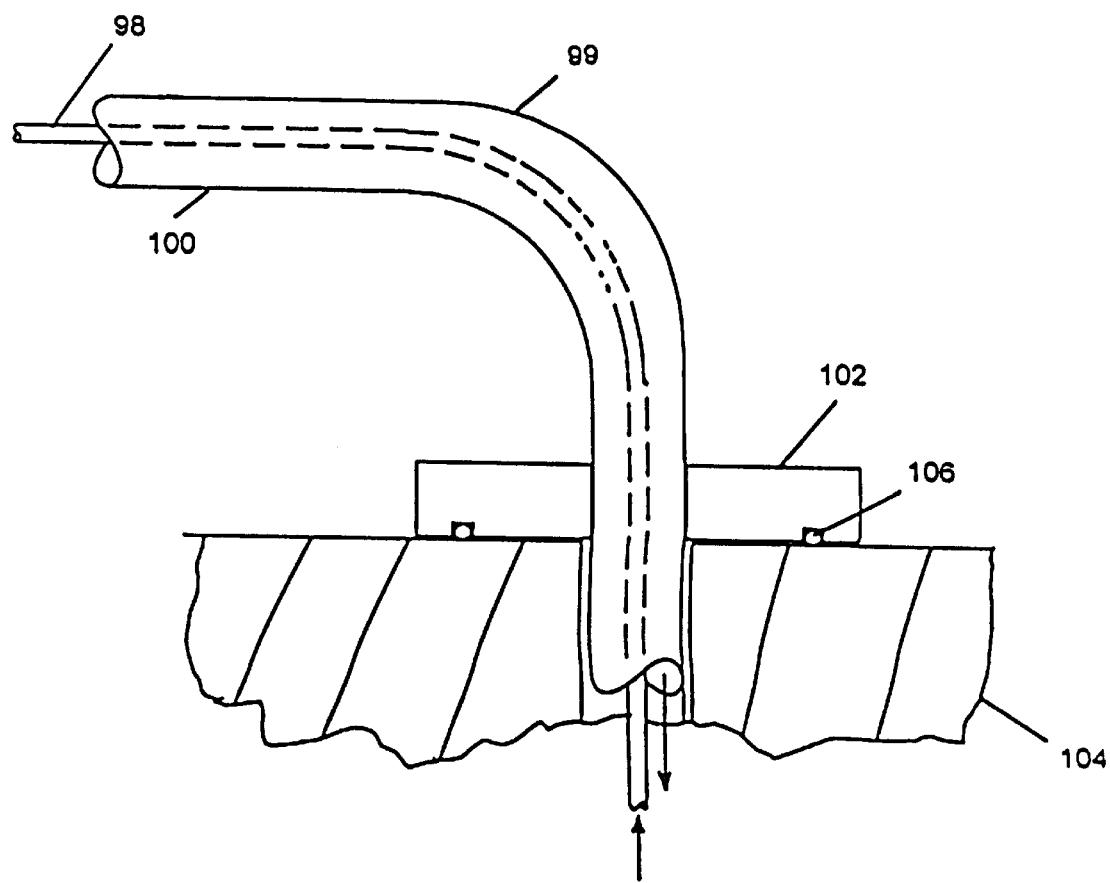
FIG. 8 is an illustrative view showing mechanisms for transfer of heat to or from external objects.

FIG. 8 shows an embodiment which is used to transfer heat to or from the refrigeration module to a heat sink or object to be cooled when these are external to a rotating disk upon which the module is carried. In this embodiment the vapor and heat transfer liquid are transferred through a coaxial double wall tube 99 having an inner liquid line 98 and an outer vapor line 100. The double wall tube is mounted on a rotatable flange 102, which is held in sealed relation to stationary mount 104 by means of an O-ring or other type of seal 106.

At one end of the tube the vapor line 98 receives vapor from an evaporator (not shown) and returns liquid from a condenser (not shown) back to the evaporator.

Figure 9:
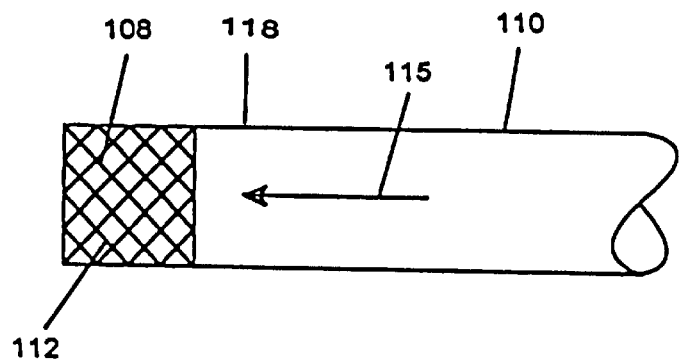
FIG. 9 shows a thermal diode module using alternate heat-transfer features.

FIG. 9 shows the evaporator end 108 of the high-temperature side TDM 110 when a heat-exchanger configuration is employed in addition to a porous MCE material. Here the heat exchanger components 112, as depicted in FIG. 7, described above, are made of malleable, machinable, formable MCE material such as gadolinium. A porous heat transfer enhancing surface is then applied to the sides of the fins as described for the low side TDM evaporator A porous heat transfer enhancing surface is then applied to the sides of the fins as described for the low side TDM evaporator end. The heat transfer fluid 115 is in direct contact with the fins/porous heat transfer enhancing surface. The hermetically sealed outer shell or body 110 may or may not also be made of MCE material. The evaporator section of FIG. 9 may also be made in the form of plate/fin passages, screens, tubes, rods or other types of heat exchanger surfaces. Components of the refrigeration module may also be arranged coaxially at their outer ends and described above with respect to FIG. 4.

In an alternate embodiment the array of MCE material disposed at the evaporator end of a high-temperature side thermal diode module may also comprise, in addition to the MCE material, a high-thermal-conductivity metal such as copper or silver in the form of small particles or spheres mixed with the MCE material and metallurgically bonded to one another and to the MCE materials as well as to the adjacent container wall. This measure provides for enhanced heat conduction paths through the matrix, while retaining the pores which serve as nucleation sites for boiling and evaporation. A mixture of 25 to 75 per cent MCE material and the balance copper or silver may be employed.

While the invention is described above in terms of specific embodiments, it is not to be understood, but is limited only as defined in the appended claims.

What is claimed is:

1. A thermal diode module for a magnetic refrigerator comprising:
   a sealed container having an evaporator end and a condenser end;
   a heat-transfer fluid disposed in said container;
   an array of magnetocaloric material subject to a reversible increase in temperature upon being exposed to a magnetic field, said array located within said container at said evaporator end and said material being in the form of a porous matrix whereby said material may come into direct thermal contact with said heat-transfer fluid during a high-temperature portion of an operating cycle;
   a condensing surface located at said condenser end; and means for returning condensed fluid to said evaporator end.

2. The thermal diode module of claim 1 wherein said matrix comprises finely divided particles of said material bonded to one another and to a wall of said container.

3. The thermal diode module of claim 2 wherein said particles have a size within the range of 100 to 1000 microns.

4. The thermal diode module of claim 2 wherein said matrix further comprises particles of a high-thermal-conductivity metal admixed with said material.

5. The thermal diode module of claim 1 wherein said condensing surface is provided with fins and grooves whereby a pressure gradient due to surface tension is created.

6. A refrigeration module comprising;
   a high-temperature side thermal diode module comprising;
   a first sealed container having an evaporator end and a condenser end;
   a heat-transfer fluid disposed in said container;
   an array comprised of magnetocaloric material subject to a reversible increase in temperature upon being exposed to a magnetic field, said array located within said container at said evaporator end and said material being in the form of a porous matrix whereby said material may come into direct thermal contact with said heat-transfer fluid during a high-temperature portion of an operating cycle;
   a condensing surface located at said condenser end; and
   means for returning condensed fluid to said evaporator end; and
   a low-temperature side thermal diode module comprising;
   a second sealed container having an evaporator end, a condenser end, a heat-transfer fluid disposed therein and a means for returning said heat-transfer fluid from said condenser end of said low-temperature thermal diode module to said evaporator end thereof; and
   the said evaporator end of said high-temperature module being disposed in heat-transferring relation to said condenser end of said low temperature module.

7. The refrigeration module of claim 6 wherein said means for returning said heat-transfer fluid from said condenser end to said evaporator end in each of said thermal diode modules comprises fins and grooves defined in surfaces of said condensor ends.

8. The refrigeration module of claim 6 wherein said low-temperature module comprises an annular structure having its condensing surface at its condenser end disposed around an inner circumference of an annular opening therein and the said high temperature side module has a cylindrical end structure at its evaporator end linearly aligned with and located within said annular opening for a distance such as to enable effective thermal contact between said low-temperature side module condenser surface and said high temperature module evaporator surface, the said thermal diodes being combined into an integral unit.

9. The refrigeration module of claim 6 wherein said high-temperature side module is generally cylindrical in shape and the low-side thermal diode is formed into an annulus surrounding the high-temperature side module and concentric therewith over a substantial portion of the length of the high-temperature module, and an end region of said refrigeration module comprises an outer annular condensing surface of said low-temperature module spaced apart from and in thermal contact with an inner annular evaporating surface of said high-temperature module whereby said material is made accessible to contact with a magnetic field from an outer end of said refrigeration module.

10. The refrigeration module of claim 9 wherein a circumferential plenum is provided in said low-temperature module over the length thereof.

11. The refrigeration module of claim 10 including a layer of insulation disposed between the outside container surface of said high-temperature module and the inside surface of said low-temperature module.

12. A magnetic refrigerator comprising:

a magnetic field generator;

at least one refrigeration module comprising a high-temperature side thermal diode module comprising a sealed container, said container having an evaporator end and a condenser end, a heat-transfer fluid and means for returning condensed heat-transfer fluid from said condenser end back to said evaporator end;

an array of magnetocaloric material subject to a reversible increase in temperature upon being exposed to a magnetic field, said array located within said container at said evaporator end and said material being in the form of a porous matrix, whereby said material may come into direct thermal contact with said heat transfer fluid during a high-temperature portion of an operating cycle;

a low-temperature side thermal diode module comprising a sealed container having an evaporator end, a condenser end, a heat transfer fluid disposed therein and means for returning condensed heat-transfer fluid back to said evaporator end;

the said evaporator end of said high-temperature module being disposed in thermal contact with the said condenser end of the said low-temperature module;

a heat sink; and means for intermittently applying a magnetic field produced by said generator to said material; and means for providing heat flow from an object to be cooled to the said material when the said material is demagnetized.

13. The magnetic refrigerator of claim 12 wherein said means for intermittently applying a magnetic field to said material comprises means for periodically moving a selected one of said field generator and said refrigerator module with respect to one another.

14. The magnetic refrigerator of claim 13 wherein said means for intermittently applying said magnetic field comprises a rotatable disk on which a said refrigeration module is mounted, a stationary support for securing said magnetic field generator in position to apply a magnetic field to a said material array when in close proximity thereto and means for rotating the disk.

15. The magnetic refrigerator of claim 13 further comprising a plurality of said refrigeration modules carried by said disk and placed so as to extend radially outward from a center of the disk to the circumference thereof.

16. The magnetic refrigerator of claim 15 wherein the evaporator end of each of the high-temperature side modules within said refrigeration modules is located adjacent the circumference of said disk.

17. The magnetic refrigerator of claim 15 wherein said porous matrix in each of said high-temperature side modules further comprises a high-thermal-conductivity metal mixed with said magnetocaloric material.

18. The magnetic refrigerator of claim 16 wherein condensing surfaces in said modules are provided with enhanced heat-transferring means.

19. The magnetic refrigerator of claim 13 further comprising a coaxial, double-walled tube for transferring heat transfer liquid and vapor to or from the said refrigeration modules to a heat sink or object to be cooled, located external to said rotating disk.

20. The magnetic refrigerator of claim 12 wherein said magnetocaloric material comprises a member of the group having the formula $Gd_5(Si_xGe_y)$.

21. A magnetic refrigerator module comprising:

a series of sets of thermal diode modules, each said set having a high-temperature side module and a low-temperature side module with a selected magnetocaloric material disposed at an evaporator end of the high-temperature module of each said set and a heat-transfer fluid carried in each said module;

said sets being staged with the high side of a first module thermally connected to the low side of a succeeding module, repeated progressively over a series;

a specific magnetocaloric material selected to provide a first, low effective temperature range for the first set and progressively higher effective temperature ranges for successive sets; and a specific heat-transfer fluid being selected for its operability at the temperature employed in a specific said set.

* * * * *